US012289482B2

(12) United States Patent
Wolowiec et al.

(10) Patent No.: US 12,289,482 B2
(45) Date of Patent: *Apr. 29, 2025

(54) METHODS, SYSTEMS, AND MEDIA FOR IDENTIFYING VIDEOS CONTAINING OBJECTIONABLE CONTENT (71) Applicant: Google LLC, Mountain View, CA (US)

(72) Inventors: Bartlomiej Wolowiec, Zürich (CH); Andreea-Alexandra Ganciulescu, Oxford (GB)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/610,920

(22) Filed: Mar. 20, 2024

(65) Prior Publication Data
US 2024/0223825 A1 Jul. 4, 2024

Related U.S. Application Data (63) Continuation of application No. 17/055,235, filed as application No. PCT/US2019/062787 on Nov. 22, 2019, now Pat. No. 11,956,484.
(Continued)

(51) Int. Cl.
H04N 21/234 (2011.01)
G06F 18/213 (2023.01)
(Continued)

(52) U.S. Cl.
CPC ..... H04N 21/23418 (2013.01); G06F 18/213 (2023.01); G06F 18/24147 (2023.01);
(Continued)

(58) Field of Classification Search
CPC .............................................. H04N 21/23418
See application file for complete search history.

(56) References Cited

U.S. PATENT DOCUMENTS 8,204,883 B1 6/2012 Smith et al.
8,649,613 B1 2/2014 Leung et al.
(Continued)

FOREIGN PATENT DOCUMENTS

CN 101711470 5/2010
CN 107409238 11/2017
(Continued)

OTHER PUBLICATIONS

Communication pursuant to Article 94(3) EPC from counterpart European Application No. 19824039.2 dated Jun. 1, 2023, 6 pp.
(Continued)

Primary Examiner — Michael H Hong
(74) Attorney, Agent, or Firm — Shumaker & Sieffert, P.A.

(57) ABSTRACT

Techniques are disclosed for identifying videos containing objectionable content. An example method comprises identifying, by a computing system, a video uploaded to a video sharing service, generating an embedding for the video using a neural network, wherein the embedding specifies a location of the video in a multi-dimensional space where a plurality of videos are located based on content of the videos, identifying from the videos a plurality of associated videos that each have an associated embedding that is located within a predetermined distance of the embedding, determining whether the video is likely to include a particular type of objectionable content by at least determining at least a predetermined amount of the associated videos that contain the particular type of objectionable content, and responsive to determining that the video is likely to include the particular type of objectionable content, causing the video to be blocked from the video sharing service.

20 Claims, 4 Drawing Sheets

Related U.S. Application Data (60) Provisional application No. 62/779,717, filed on Dec. 14, 2018.

(51) Int. Cl.
    *G06F 18/2413*     (2023.01)
    *G06N 3/04*     (2023.01)
    *H04N 21/258*     (2011.01)
    *H04N 21/2743*     (2011.01)
    *H04N 21/454*     (2011.01)

(52) U.S. Cl.
    CPC ......... *G06N 3/04* (2013.01); *H04N 21/25875* (2013.01); *H04N 21/2743* (2013.01); *H04N 21/454* (2013.01)

(56) References Cited

U.S. PATENT DOCUMENTS

| | | | |
|---|---|---|---|
| 8,706,675 | B1 | 4/2014 | Samaniego et al. |
| 9,053,416 | B1 | 6/2015 | De Leo et al. |
| 11,216,701 | B1 | 1/2022 | Sim et al. |
| 2007/0067258 | A1 | 3/2007 | Theilmann |
| 2008/0168490 | A1 | 7/2008 | Yu |
| 2009/0177670 | A1 | 7/2009 | Grenier et al. |
| 2009/0274364 | A1 | 11/2009 | Shakya et al. |
| 2013/0085825 | A1 | 4/2013 | Davis et al. |
| 2016/0239493 | A1 | 8/2016 | Stroganov |
| 2016/0350675 | A1 | 12/2016 | Laks et al. |
| 2017/0039554 | A1 | 2/2017 | Greifeneder et al. |
| 2017/0357896 | A1 | 12/2017 | Tsatsin et al. |
| 2018/0012460 | A1 | 1/2018 | Heitz, III et al. |
| 2018/0053042 | A1 | 2/2018 | Philbin et al. |
| 2018/0121827 | A1 | 5/2018 | Green |
| 2018/0336888 | A1 | 11/2018 | Jiang et al. |
| 2018/0349796 | A1* | 12/2018 | Gibbs ................... H04L 63/104 |
| 2021/0142097 | A1 | 5/2021 | Zheng et al. |
| 2021/0227291 | A1 | 7/2021 | Wolowiec et al. |

FOREIGN PATENT DOCUMENTS

| | | |
|---|---|---|
| CN | 107566903 | 1/2018 |
| CN | 108874886 | 11/2018 |
| EP | 3316185 A1 | 5/2018 |

OTHER PUBLICATIONS

Communication pursuant to Rules 161(1) and 162 EPC from counterpart European Application No. 19824039.2 dated Dec. 1, 2020, 3 pp.
Examination Report dated Jun. 1, 2023 in EP Patent Application No. 19824039.2.
International Preliminary Report on Patentability from International Application No. PCT/US2019/062787 dated Jun. 8, 2021, 7 pp.
International Search Report and Written Opinion of International Application No. PCT/US2019/062787 dated Feb. 7, 2020, 11 pp.
Office Action dated Jan. 19, 2022 in CN Patent Application No. 201980038483.5.
Office Action dated Jun. 30, 2022 in CN Patent Application No. 201980038483.5.
Office Action from counterpart Chinese Application No. 201980038483.5 dated Jan. 30, 2024, 11 pp.
Office Action, and translation thereof, from counterpart Chinese Application No. 201980038483.5 dated Nov. 10, 2023, 15 pp.
Prosecution History from U.S. Appl. No. 17/055,235, dated Nov. 13, 2020 through Jan. 10, 2024, 150 pp.
Response to Communication pursuant to Article 94(3) EPC dated Jun. 1, 2023, from counterpart European Application No. 19824039.2 filed Dec. 11, 2023, 19 pp.
Response to Communication pursuant to Article 94(3) EPC dated Jun. 1, 2023, from counterpart European Application No. 19824039.2 filed Dec. 11, 2023, 21 pp.
Response to Communication Pursuant to Rules 161(1) and 162 EPC dated Dec. 1, 2020, from counterpart European Application No. 19824039.2, filed Jun. 8, 2021, 8 pp.
Response to Office Action dated Nov. 10, 2023, from counterpart Chinese Application No. 201980038483.5 filed Dec. 25, 2023, 11 pp.
Schroff et al., "FaceNet: A Unified Embedding for Face Recognition and Clustering", Computer Vision Foundation, Jun. 2015, 10 pp.

\* cited by examiner

FIG. 4

METHODS, SYSTEMS, AND MEDIA FOR IDENTIFYING VIDEOS CONTAINING OBJECTIONABLE CONTENT

CROSS-REFERENCE TO RELATED APPLICATION

This application is a continuation of U.S. patent application Ser. No. 17/055,235, filed 22 Nov. 2019, which is a national stage of International Patent Application No. PCT/US2019/062787, filed 22 Nov. 2019, which claims the benefit of U.S. Provisional Patent Application No. 62/779,717, filed 14 Dec. 2018, the entire content of each application is incorporated herein by reference.

TECHNICAL FIELD

The disclosed subject matter relates to methods, systems, and media for identifying videos containing objectionable content.

BACKGROUND

Video sharing services and social media services may provide users with user-generated video content that can be uploaded by users and viewed by other users. For example, a first user may create a video and upload the video to a video sharing service or a social media service, and a second user may want to stream or download the video for viewing. In some cases, users may upload videos that contain objectionable content, such as pornography, objectionable language, violence, etc. However, it can be difficult for a video sharing service or a social media service to detect an uploaded video that includes objectionable content and it can be difficult to detect such objectionable content quickly for potential removal from the service.

Accordingly, it is desirable to provide new methods, systems, and media for identifying videos containing objectionable content.

SUMMARY

Methods, systems, and media for identifying videos containing objectionable content are provided.

In accordance with some embodiments of the disclosed subject matter, a method for identifying videos containing objectionable content is provided, the method comprising: identifying, using a hardware processor, a video that has been uploaded to a video sharing service; predicting an embedding for the uploaded video using a neural network, wherein the embedding specifies a location of the video in a multi-dimensional space where videos are located based on content of the videos; identifying a plurality of videos located near the uploaded video in the multi-dimensional space based on the predicted embedding; determining whether the uploaded video is likely to include objectionable content based on content of the plurality of videos located near the video in the multi-dimensional space; and in response to determining that the uploaded video is likely to include objectionable content, causing the uploaded video to be blocked from the video sharing service.

In some embodiments, the method further comprises transmitting an indication of the uploaded video to a user account associated with a verifier prior to causing the uploaded video to be blocked from the video sharing service, wherein the uploaded video is blocked in response to receiving a verification from the user account associated with the verifier that the uploaded video includes the objectionable content.

In some embodiments, the indication of the uploaded video is transmitted to the user account associated with the verifier in response to determining that a confidence level that the uploaded video is likely to include the objectionable content is below a predetermined threshold.

In some embodiments, the indication of the uploaded video is transmitted to the user account associated with the verifier in response to determining that the videos of the plurality of videos are known to include a particular type of objectionable content.

In some embodiments, identifying the plurality of videos located near the uploaded video comprises transmitting a query to a remote server that includes the predicted embedding for the uploaded video.

In some embodiments, determining whether the uploaded video is likely to include objectionable content comprises determining whether videos of the plurality of videos are known to include a particular type of objectionable content.

In some embodiments, determining whether the uploaded video is likely to include objectionable content comprises determining that more than a predetermined number of videos or a predetermined percentage of videos identified as nearest neighbors of the video in the multi-dimensional space contain objectionable content.

In some embodiments, the content of the plurality of videos includes whether each video in the plurality of videos includes a plurality of types of objectionable content and whether each video in the plurality of videos is associated with a plurality of topics.

In accordance with some embodiments of the disclosed subject matter, a system for identifying videos containing objectionable content is provided, the system comprising a hardware processor that is configured to: identify a video that has been uploaded to a video sharing service; predict an embedding for the uploaded video using a neural network, wherein the embedding specifies a location of the video in a multi-dimensional space where videos are located based on content of the videos; identify a plurality of videos located near the uploaded video in the multi-dimensional space based on the predicted embedding; determine whether the uploaded video is likely to include objectionable content based on content of the plurality of videos located near the video in the multi-dimensional space; and, in response to determining that the uploaded video is likely to include objectionable content, cause the uploaded video to be blocked from the video sharing service.

In accordance with some embodiments of the disclosed subject matter, a non-transitory computer-readable medium containing computer executable instructions that, when executed by a processor, cause the processor to perform a method for identifying videos containing objectionable content is provided, the method comprising: identifying a video that has been uploaded to a video sharing service; predicting an embedding for the uploaded video using a neural network, wherein the embedding specifies a location of the video in a multi-dimensional space where videos are located based on content of the videos; identifying a plurality of videos located near the uploaded video in the multi-dimensional space based on the predicted embedding; determining whether the uploaded video is likely to include objectionable content based on content of the plurality of videos located near the video in the multi-dimensional space; and, in response to determining that the uploaded video is likely to include objectionable content, causing the uploaded video to be blocked from the video sharing service.

In accordance with some embodiments of the disclosed subject matter, a system for identifying videos containing objectionable content is provided, the system comprising: means for identifying a video that has been uploaded to a video sharing service; means for predicting an embedding for the uploaded video using a neural network, wherein the embedding specifies a location of the video in a multi-dimensional space where videos are located based on content of the videos; means for identifying a plurality of videos located near the uploaded video in the multi-dimensional space based on the predicted embedding; means for determining whether the uploaded video is likely to include objectionable content based on content of the plurality of videos located near the video in the multi-dimensional space; and, in response to determining that the uploaded video is likely to include objectionable content, means for causing the uploaded video to be blocked from the video sharing service.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for identifying videos containing objectionable content are provided.

In some embodiments, the mechanisms described herein can be used to predict whether a video (e.g., a video uploaded to a video sharing service, and/or any other suitable video) includes objectionable content, such as violence, pornography, objectionable language, animal abuse, and/or any other type of objectionable content.

In some embodiments, the mechanisms can predict whether a particular video includes objectionable content by determining an embedding for the particular video based on any suitable features of the video (e.g., features of video content of the video, features of audio content of the video, features associated with metadata of the video, and/or any other suitable features), where the embedding indicates a position of the particular video in a multi-dimensional space. In some such embodiments, videos within a multi-dimensional space are located based on content included in the videos, such as whether a video includes a particular type of objectionable content (e.g., violence, pornography, objectionable language, etc.), a topic of the video, and/or based on any other suitable content.

In some embodiments, the mechanisms can then predict whether a particular video includes objectionable content by identifying N nearest neighbors to the particular video based on the embedding of the particular video and embeddings of other videos within the multi-dimensional space. For example, in some embodiments, the mechanisms can determine whether the particular video is likely to include a particular type of objectionable content based on whether the N nearest neighbor videos are known to include the particular type of objectionable content (e.g., as determined by human verifiers, and/or known in any other suitable manner). As a more particular example, in some embodiments, the mechanisms can determine that a particular video is likely to include violent content in an instance in which the mechanisms determine that more than a predetermined percentage of the N nearest neighbor videos in the multi-dimensional space contain violent content.

In some embodiments, the mechanisms can determine an embedding for a particular video in any suitable manner. For example, in some embodiments, the mechanisms can determine an embedding using a neural network (e.g., a deep convolutional network, and/or any other suitable type of neural network) that has been trained using other videos as samples that are known to contain particular types of content (e.g., particular types of objectionable content, related to particular topics, and/or include any other suitable types of content). In some embodiments, the neural network can be trained using a training set of any suitable format. For example, in some embodiments, the neural network can be trained using a set of videos that have been assigned labels indicating whether each video in the set of videos includes particular types of content (e.g., whether the video includes violence, whether the video includes pornography, etc.), as described below in more detail in connection with FIG. 1. In some such embodiments, the assigned labels can be assigned in any suitable manner, such as manually, algorithmically, a combination of algorithmically and manually, and/or in any other suitable manner. As another example, in some embodiments, each training sample in a training set can include a triplet of video samples, such as an anchor-positive-negative triplet, where a positive sample is similar to an anchor sample and a negative sample is dissimilar to an anchor sample, as described below in more detail in connection with FIG. 2.

That is, in some embodiments, the mechanisms described herein can train a network to learn a Euclidean embedding for a particular video such that squared L2 distances in a multi-dimensional embedding space directly correspond to similarity between videos with respect to content of the videos. In particular, in some embodiments, videos that contain similar types of content (e.g., that contain the same type of objectionable content, that are related to similar topics, and/or content any other similar type of content) can have small distances from each other and videos that contain dissimilar types of content can have large distances. In some embodiments, after the embedding has been generated, the mechanisms can predict whether a particular video is likely to contain objectionable content using a k-nearest neighbor identification in the multi-dimensional embedding space.

Figure 1:
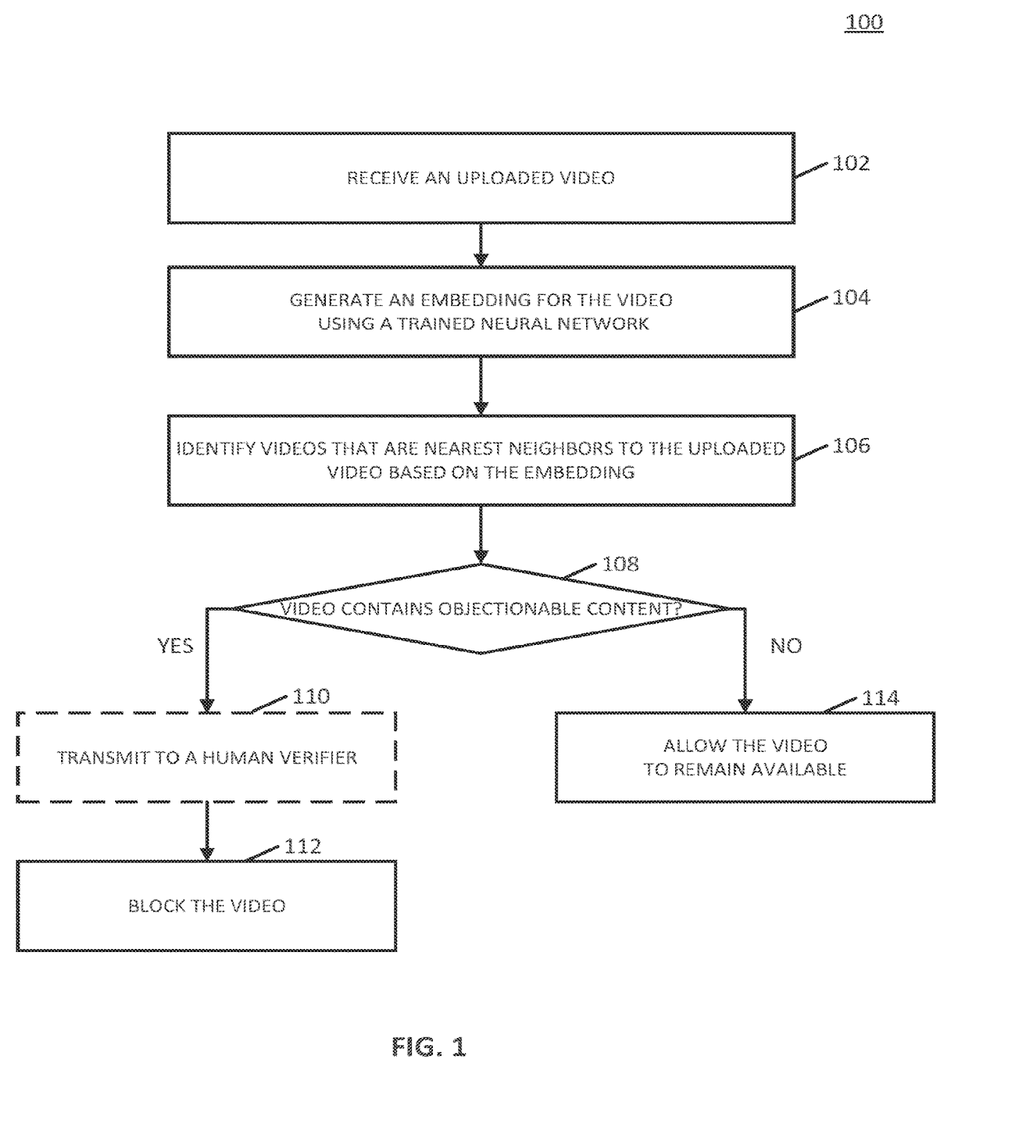
FIG. 1 shows an illustrative example of a process for determining if an uploaded video contains objectionable content in accordance with some embodiments of the disclosed subject matter.

Turning to FIG. 1, an example 100 of a process for identifying videos containing objectionable content is shown in accordance with some embodiments of the disclosed subject matter. In some embodiments, blocks of process 100 can be performed by any suitable device, such as an embedding generation server and/or an identification server, as shown in and described below in connection with FIG. 3.

Process 100 can begin at 102 by receiving an uploaded video. In some embodiments, process 100 can receive the video from any suitable source. For example, in some embodiments, an embedding generation server can receive an uploaded video from a server associated with a video sharing service that receives videos created by and/or generated by users. In some embodiments, an uploaded video can include any suitable content (e.g., video content, audio content corresponding to the video content, captions, and/or any other suitable content). In some embodiments, an uploaded video can be associated with any suitable information provided by a user who uploads the video, such as a title of the video, a name of a creator of the video, a date the video was created, a topic of the video, and/or any other suitable information.

At 104, process 100 can generate an embedding for the video using a trained neural network. In some embodiments, the neural network can be any suitable type of neural network, such as a deep convolutional network, and/or any other suitable type of neural network. In some embodiments, the embedding can indicate any suitable information. For example, in some embodiments, the embedding can indicate a location or position of the video within a multi-dimensional space that clusters videos based on content of the videos. As a more particular example, in some embodiments, videos that contain similar types of objectionable content (e.g., violence, pornography, objectionable language, etc.) can be clustered near each other. As a specific example, videos that contain or are likely to contain violence can be clustered together within the multi-dimensional space, and videos that contain or are likely to contain objectionable language can be clustered together within the multi-dimensional space. In some such embodiments, an embedding for a video can indicate a position of the video within the multi-dimensional space.

In some embodiments, the neural network can be trained in any suitable manner. For example, in some embodiments, the neural network can be trained using a training set that includes videos that have previously been verified (e.g., manually verified by humans, and/or verified in any other suitable manner) to contain particular types of content. As a more particular example, in some embodiments, the neural network can be trained using a training set of videos that are each associated with a first vector of objectionable content labels and a second vector of topic labels. In some such embodiments, each vector can include any suitable number of elements, where each element corresponds to a specific type of content. For example, elements in an objectionable content vector can correspond to specific types of objectionable content (e.g., violence, pornography, objectionable language, etc.). Continuing with this example, a video that is known to contain both violence and pornography but no objectionable language can be associated with an objectionable content vector such as [1, 1, 0]. As another example, in some embodiments, elements of a topic labels vector can correspond to specific topics or content, such as music videos, news content, unboxing videos, etc. Continuing with this example, a video that is known to be a music video can be associated with a topic labels vector such as [1, 0, 0].

Note that, in some embodiments, labels used in label vectors can be identified or determined in any suitable manner. For example, in some embodiments, an objectionable content vector for a particular video can be determined based on an algorithmic analysis of video content of the video, a manual analysis (e.g., by a human verifier), and/or in any other suitable manner. As another example, in some embodiments, a topic labels vector for a particular video can be determined based on an algorithmic analysis (e.g., of metadata associated with the video, of audio content or video content associated with the video, and/or based on any other suitable information), a manual analysis, and/or in any other suitable manner.

In some embodiments, features of a video can be identified and used as inputs to the neural network. For example, in some embodiments, features can indicate visual features of video content of a video, audio features of audio content associated with a video, metadata associated with a video (e.g., metadata indicating a title of a video, a creator of a video, a channel with which the video is associated, a number of views of the video, a topic of the video, keywords associated with the video, a duration of the video, and/or any other suitable metadata), and/or any other suitable features. In some embodiments, any suitable number of features can be used for a particular video as inputs to the neural network.

In some embodiments, the neural network can be trained using any suitable technique or combination of techniques. For example, in some embodiments, the neural network can be trained using anchor-positive-negative triplets, where each training sample includes an anchor sample, a positive sample that is similar to the anchor sample, and a negative sample that is dissimilar to the anchor sample. More detailed techniques for generating a training set for the neural network and training the neural network are shown in and described below in more detail in connection with FIG. 2.

At 106, process 100 can identify videos that are nearest neighbors to the uploaded video in the multi-dimensional space based on the embedding. In some embodiments, process 100 can identify the videos in any suitable manner. For example, in some embodiments, process 100 can query an identification server (e.g., as shown in and described below in connection with FIG. 3) that stores embeddings of videos and associated assigned labels (e.g., as described above in connection with block 104) and that returns N videos that are clustered near the uploaded video based on embeddings of each video. As a more particular example, in some embodiments, process 100 can identify the N nearest neighbors using any suitable clustering algorithm (e.g., K-nearest neighbors, k-means, agglomerative clustering, and/or any other suitable clustering algorithm) applied to the embeddings of each video. Note that, in some embodiments, process 100 can identify any suitable number (e.g., ten, fifteen, twenty, and/or any other suitable number) of nearest neighbor videos.

At 108, process 100 can determine whether the uploaded video is likely to contain objectionable content. In some embodiments, process 100 can determine whether the uploaded video is likely to contain objectionable content based on any suitable information, such as the videos identified as nearest neighbors to the uploaded video and assigned labels corresponding to each of the videos identified as nearest neighbors. For example, in some embodiments, process 100 can determine that the uploaded video is likely to contain a particular type of objectionable content in response to determining that more than a predetermined number of videos or more than a predetermined percentage of videos identified as nearest neighbors contain the particular type of objectionable content based on labels assigned to each of the identified neighboring videos. As a more particular example, in an instance where more than a predetermined percentage of videos (e.g., more than 50%, more than 70%, and/or any other suitable percentage) contain violence based on an objectionable content vector (as described above in connection with block 104), process 100 can determine that the uploaded video is also likely to contain violence. Note that, in some embodiments, process 100 can determine that the uploaded video is likely to contain multiple types of objectionable content.

Note that, in some embodiments, process 100 can determine a confidence level associated with a determination of whether the uploaded video is likely to contain objectionable content. In some embodiments, process 100 can determine the confidence level based on any suitable information. For example, in some embodiments, process 100 can determine the confidence level that the uploaded video contains a particular type of objectionable content based on a percentage of neighboring videos that contain the particular type of objectionable content. As a more particular example, process 100 can assign a relatively higher confidence level in an instance in which 100% of neighboring videos contain a particular type of objectionable content compared to an instance in which 70% of neighboring videos contain a particular type of objectionable content. As another example, in some embodiments, process 100 can determine the confidence level based on a number of videos in a cluster to which the identified neighboring videos belong. As a more particular example, process 100 can assign a relatively higher confidence level in an instance in which the identified neighboring videos are assigned to a larger cluster (e.g., a cluster of 1000 videos, and/or any other suitable number) compared to an instance in which the identified neighboring videos come are assigned to a smaller cluster (e.g., 100 videos, and/or any other suitable number).

If, at 108, process 100 determines that the uploaded video is likely to contain objectionable content ("yes" at 108), process 100 can proceed to 110 and can transmit the uploaded video to a human verifier. In some embodiments, the uploaded video can be transmitted in any suitable manner. For example, in some embodiments, process 100 can transmit a message to a user account associated with a human verifier that indicates the uploaded video (e.g., contains a link to the uploaded video, an identifier of the uploaded video, and/or any other suitable information) and/or an indication of the objectionable content identified at block 108. In some embodiments, the human verifier can then determine whether the uploaded video does contain the objectionable content.

Note that, in some embodiments, process 100 can determine whether the uploaded video is to be transmitted to a human verifier for verification. For example, in some embodiments, process 100 can determine whether the uploaded video is to be transmitted to the human verifier based on a confidence level associated with the determination that the uploaded video contains a particular type of objectionable content. As a more particular example, in some embodiments, process 100 can determine that the uploaded video is to be transmitted to the human verifier in response to determining that the confidence level is lower than a predetermined threshold (e.g., below 50%, below 70%, and/or any other suitable threshold). In some embodiments, in instances where process 100 determines that the uploaded video is not to be transmitted to a human verifier, block 110 can be omitted.

At 112, process 100 can block the video. In some embodiments, process 100 can block the video in any suitable manner. For example, in some embodiments, process 100 can remove the uploaded video from a server to which the video was uploaded. As another example, in some embodiments, process 100 can transmit a message to a user account associated with upload of the video that indicates that the video has been blocked in response to determining that the video is likely to contain a particular type of objectionable content.

Note that, in instances in which the uploaded video was transmitted to a human verifier and in which the human verifier determined that the uploaded video does not contain objectionable content, block 112 can be omitted, and process 100 can proceed to block 114 and can allow the video.

Additionally, note that, in some embodiments, process 100 can perform any other suitable actions at 112 in response to determining that the uploaded video is likely to contain objectionable content. For example, in some embodiments, process 100 can apply an age restriction for a viewer to view the uploaded video. As a more particular example, in some embodiments, process 100 can assign any suitable minimum age (e.g., 18, and/or any other suitable age), and can require that a user of a user device that requests presentation of the uploaded video confirm that the user is older than the minimum age. As another example, in some embodiments, process 100 can inhibit advertisements from being shown in connection with the uploaded video (e.g., inhibit pre-roll advertisements shown before presentation of the uploaded video, inhibit insertion of advertisements within the uploaded video, and/or inhibit any other suitable type of advertisements).

Referring back to block 108, if, at 108, process 100 determines that the uploaded video does not contain objectionable content ("no" at 108), process 100 can proceed to 114 and can allow the video. In some embodiments, process 100 can allow the video in any suitable manner. For example, in some embodiments, process 100 can allow the video to be added to a video sharing service that allows users to download and/or stream the video. As another example, in some embodiments, process 100 can include the video in any suitable playlists or collections of videos.

Note that, in some embodiments, the techniques described above in connection with process 100 can be applied to identify a group of similar videos to a video that is known to contain a particular type of objectionable content. For example, in an instance where a first video is known to contain a particular type of objectionable content (e.g., based on an algorithmic verification that the first video contains the type of objectionable content, based on a manual verification that the first video contains the type of objectionable content, and/or based on any other suitable verification), process 100 can identify one or more videos that are associated with embeddings that are within a predetermined distance (e.g., a Euclidean distance, and/or any other suitable distance metric) of an embedding of the first video within the multi-dimensional space. As a more particular example, in some embodiments, process 100 can generate embeddings for a group of videos that have not yet been analyzed for containing objectionable content and can identify videos for which associated embeddings are within a predetermined distance of the embedding of the first video. In some such embodiments, process 100 can determine that the identified videos are likely to contain the same type of objectionable content as that of the first video. In some such embodiments, process 100 can cause indications of the identified one or more videos that are likely to contain the same type of objectionable content as the first video to be transmitted to a user account associated with a human verifier, as described above in connection with block 110 of FIG. 1.

Figure 2:
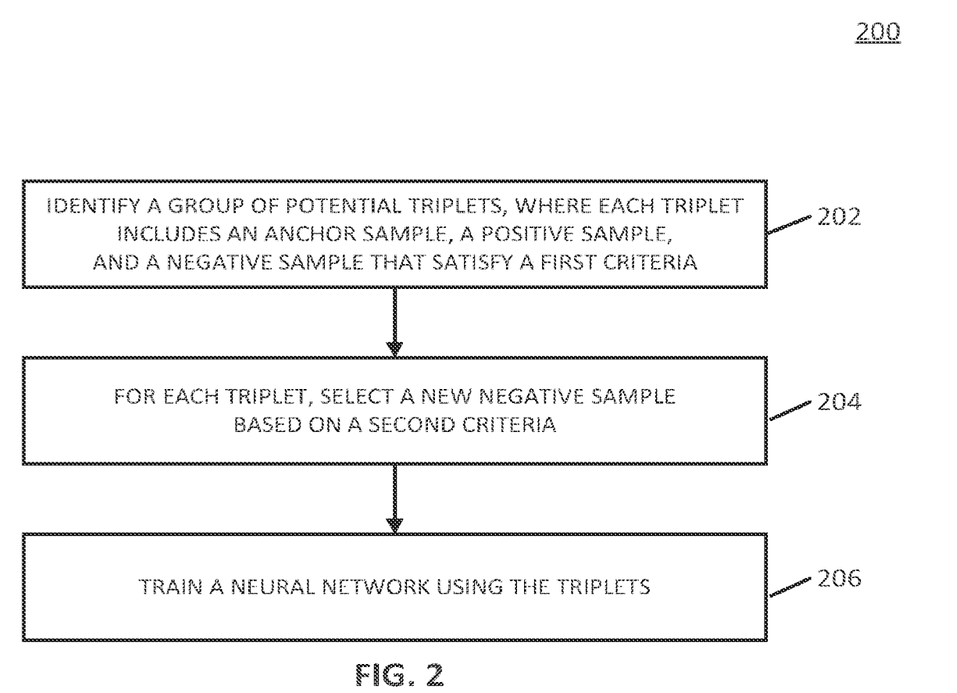
FIG. 2 shows an illustrative example of a process for creating training sets for a neural network in accordance with some embodiments of the disclosed subject matter.

Turning to FIG. 2, an example 200 of a process for generating training samples for a neural network and training the neural network that generates an embedding for a particular video is shown in accordance with some embodiments of the disclosed subject matter. As described above in connection with block 104 of FIG. 1, in some embodiments, the embedding generated by the neural network can indicate a location of the particular video in a multi-dimensional space in which videos are clustered based on types of content included in each video.

Note that, in some embodiments, the neural network can have any suitable structure. For example, in some embodiments, the neural network can include an input layer. In some embodiments, the input layer can be any suitable type of input layer, such as a feed-forward input layer, a convolutional neural network, and a recurrent neural network. As another example, in some embodiments, the neural network can include a deep convolutional neural network layer with any suitable number of layers and any suitable number of neurons per layer. As yet another example, in some embodiments, the deep convolutional neural network layer(s) can be followed by L2 normalization, which can generate an embedding.

In some embodiments, the neural network can be trained using anchor-positive-negative triplet examples, where each example in a training set includes an anchor sample, a positive sample that is similar to the anchor sample, and a negative sample that is dissimilar to the positive sample. In some embodiments, each sample can be a video with known content (e.g., known to include particular types of objectionable content, and/or known to include any other suitable type of content). In some embodiments, during training, the neural network can minimize a triplet loss function. Detailed techniques for selection of anchor-positive-negative triplets during training of the neural network are described below to allow the neural network to converge quickly.

Process 200 can begin at 202 by identifying a group of potential triplets that satisfy a first criteria. In some embodiments, each triplet in the group of potential triplets can include three samples, an anchor sample, a positive sample that is similar to the anchor sample, and a negative sample that is dissimilar to the anchor sample. Note that, in some embodiments, each sample can correspond to a video that has been uploaded to a video sharing service, and/or any other suitable video.

In some embodiments, each triplet in the group of potential triplets can be identified based on a first criteria that indicates whether the positive sample is similar to the anchor sample and that indicates whether the negative sample is dissimilar to the anchor sample. For example, in some embodiments, the first criteria can be based on the objectionable content label vector and/or a topic label vector as described above in connection with block 104 of FIG. 1. As a more particular example, in some embodiments, the first criteria can be that a number of common elements in an objectionable content label vector and/or a topic label vector that are 1 and that indicate a presence of the same type of content for a video corresponding to the anchor sample and a video corresponding to the positive sample be greater than a number of common elements in an objectionable content label vector and/or a topic label vector that are 1 for the video corresponding to the anchor sample and a video corresponding to the negative sample. As a specific example, in an instance in which an objectionable content vector for a first video is [1, 1, 0], an objectionable content vector for a second video is [1, 1, 0], and an objectionable content vector for a third video is [1, 0, 0], process 200 can determine that the first video and the second video can be an anchor sample and a positive sample, respectively, and that the third video can be a negative sample, because the first video and the second video both are associated with vectors with 1s for the first two elements, whereas the third video is associated with a vector than only has a 1 for the first element. That is, in some embodiments, process 200 can determine that the first video and the second video can be an anchor sample and a positive sample, respectively, because the first video and the second video share more elements that are 1 than the first video and the third video.

In some embodiments, process 200 can select the triplets that satisfy the first criteria in any suitable manner. For example, in some embodiments, process 200 can enumerate any suitable set of potential triplets (e.g., any suitable triple-wise pairing of samples), and can eliminate triplets in the set of potential triplets that do not satisfy the first criteria. As a more particular example, in some embodiments, given a set of three videos (e.g., A, B, and C), process 200 can enumerate a set of potential triplets such as: {anchor=A, positive=B, negative=C; anchor=B, positive=A, negative=C; etc.}, and can eliminate triplets from the set of potential triplets that do not satisfy the first criteria as described above. As another example, in some embodiments, process 200 can select any suitable videos that are to correspond to anchor samples and can select videos that are to correspond to positive samples and/or negative samples for each anchor sample based on the first criteria.

At 204, process 200 can, for each triplet in the group of potential triplets, select a new negative sample based on a second criteria. In some embodiments, the second criteria can be based on any suitable information, such as a relationship between distances between two samples in a triplet in the multi-dimensional space indicated by an embedding of each sample. Note that, in some embodiments, the following definitions can be used with respect to the second criteria, where d is a Euclidean distance between samples and where alpha is a parameter of the neural network (note that selection of alpha is described below in more detail below in connection with block 206):

$$\text{Hard: } d(A, N) < d(A, P)$$

$$\text{Semi-hard: } d(A, P) < d(A, N) < d(A, P) + \text{alpha}$$

$$\text{Easy: } d(A, P) + < d(A, N))$$

As a more particular example, in some embodiments, the second criteria can be that a new negative sample is selected that, when replacing a negative sample in a triplet of the group of potential triplets, gives the hardest semi-hard triplet. In some embodiments, in instances in which there is no negative sample that gives the hardest semi-hard triplet, process 200 can select a negative sample that gives the easiest hard triplet.

In some embodiments, process 200 can iterate through the group of potential triplets and select new negative samples for each triplet that satisfy the second criteria to construct a training set for the neural network.

At 206, process 200 can train the neural network using the anchor-positive-negative triplets generated at block 204. Note that, in some embodiments, the group of anchor-positive-negative triplets can be a batch of training samples that are input to the neural network in an input layer. In some embodiments, the neural network can have any suitable number of layers and any suitable number of artificial neurons in each layer. Note that, in some embodiments, the neural network can have any suitable parameters, such as alpha (as described above in connection with block 204), a learning rate, a dropout parameter, and/or any other suitable parameters. In some embodiments, any suitable parameters associated with the neural network, as well as the number of layers and the number of neurons in each layer can be determined using any suitable technique, such as hyperparameter tuning.

In some embodiments, the neural network can be trained in any suitable manner. For example, in some embodiments, a triplet loss can be calculated for each input batch, and weights of the neural network can be updated using any suitable technique(s), such as Stochastic Gradient Descent with backpropagation and/or AdaGrad, and/or any other suitable technique or combination of techniques. An example of a triplet loss function that can be calculated and minimized is:

$$L = \sum_{i=1}^{N} \max(d(A_i - P_i) - d(A_i - N_i) - \alpha, 0),$$

where $A_i$, $P_i$, and $N_i$ are anchor, positive, and negative samples, respectively, and where a is a triplet loss margin. Another example of a triplet loss function that can be calculated and minimized is:

$$L = \sum_{i=1}^{N} d(A_i - P_i)^2 - d(A_i - N_i)^2,$$

where $A_i$, $P_i$, and $N_i$ are anchor, positive, and negative samples, respectively. Note that, in some embodiments, any suitable weighted normalization can be applied to the loss function.

In some embodiments, after computing a triplet loss (as described above) with an input batch as generated at blocks 202 and 204, process 200 can loop back to block 202 and generate a new input batch of triplets and iterate through the neural network again. In some such embodiments, process 200 can loop until any suitable convergence criteria are met.

As described above in connection with block 104 of FIG. 1, in some embodiments, the trained neural network can be used to generate an embedding for a video, where the embedding specifies a location for the video in a multi-dimensional space based on a likelihood that the video includes particular types of content, such as particular types of objectionable content.

Figure 3:
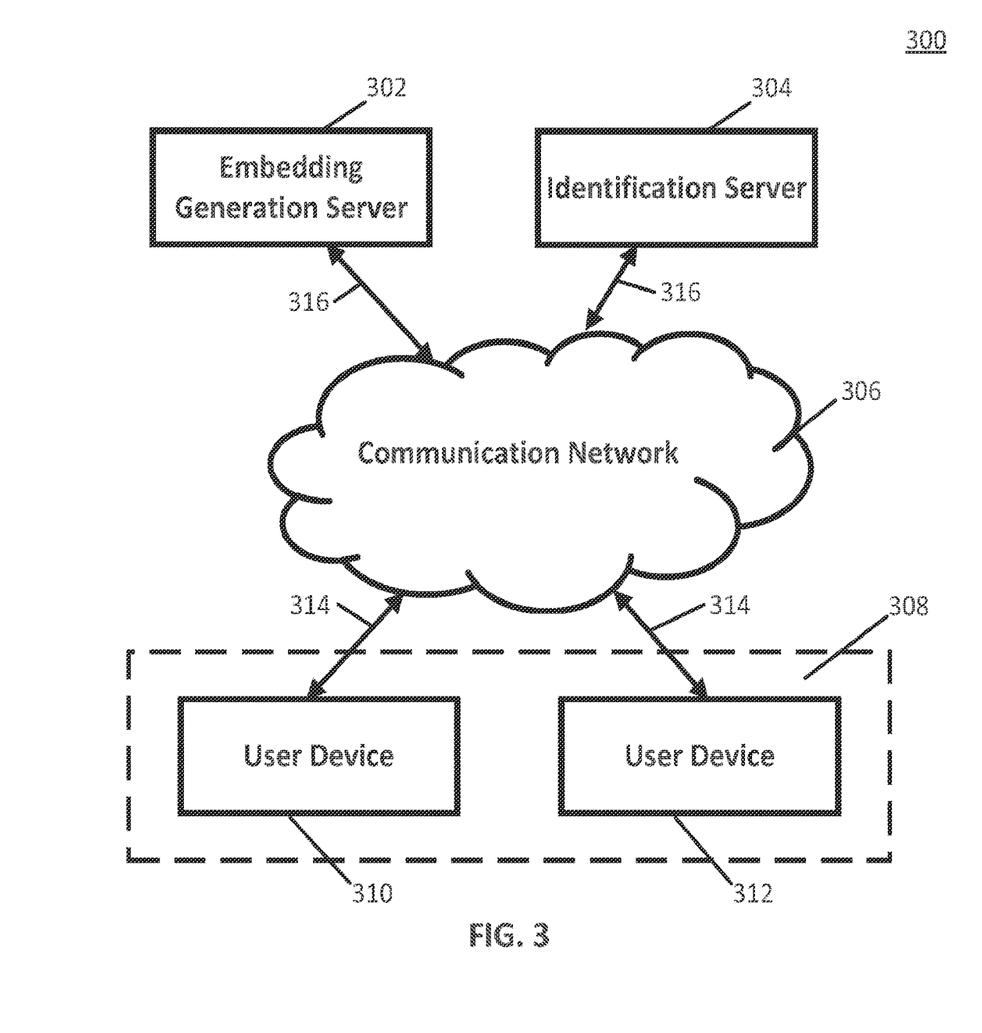
FIG. 3 shows a schematic diagram of an illustrative system suitable for implementation of mechanisms described herein for identifying videos containing objectionable content in accordance with some embodiments of the disclosed subject matter.

Turning to FIG. 3, an example 300 of hardware for identifying videos containing objectionable content that can be used in accordance with some embodiments of the disclosed subject matter is shown. As illustrated, hardware 300 can include an embedding generation server 302, an identification server 304, a communication network 306, and/or one or more user devices 308, such as user devices 310 and 312.

Embedding generation server 302 can be any suitable server(s) for generating an embedding for a particular video. For example, as described above in connection with FIG. 1, in some embodiments, embedding generation server 302 can generate an embedding for an identified video using a neural network that has been trained using other videos. In some embodiments, the embedding can indicate a position of the video in a multi-dimensional space, where videos are clustered within the multi-dimensional space based on content included in the videos (e.g., different types of objectionable content, topics of videos, and/or any other suitable video content).

Identification server 304 can be any suitable server(s) for determining whether a particular video is likely to contain objectionable content. For example, as described above in connection with FIG. 1, in some embodiments, identification server 304 can receive an indication of an embedding generated for a particular video and can identify videos that are near the particular video based on the embeddings for each video in a multi-dimensional space. In some such embodiments, identification server 304 can then determine whether the particular video is likely to contain particular types of objectionable content (e.g., violence, pornography, objectionable language, etc.) based on whether neighbors of the particular video within the multi-dimensional space contain the particular types of objectionable content.

Communication network 306 can be any suitable combination of one or more wired and/or wireless networks in some embodiments. For example, communication network 306 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 308 can be connected by one or more communications links (e.g., communications links 314) to communication network 306 that can be linked via one or more communications links (e.g., communications links 316) to servers 302 and/or 304. The communications links can be any communications links suitable for communicating data among user devices 308, embedding generation server 302, and/or identification server 304, such as network links, dial-up links, wireless links, hard-wired links, any other suitable communications links, or any suitable combination of such links.

User devices 308 can include any one or more user devices suitable for creating video content, uploading video content to a video sharing service, viewing video content, and/or performing any other suitable functions. In some embodiments, user devices 308 can include any suitable types of user devices, such as a mobile phone, a wearable computer, a tablet computer, a laptop computer, a desktop computer, a vehicle information or entertainment system, a game console, a television, a media player, speakers, and/or any other suitable type of user device.

Although embedding generation server 302 and identification server 304 are each illustrated as one device, the functions performed by servers 302 and 304 can be performed using any suitable number of devices in some embodiments. For example, in some embodiments, multiple devices can be used to implement the functions performed by embedding generation server 302. As another example, in some embodiments, a single device can be used to implement the functions performed by embedding generation server 302 and identification server 304.

Although two user devices 310 and 312 are shown in FIG. 3 to avoid over-complicating the figure, any suitable number of user devices, and/or any suitable types of user devices, can be used in some embodiments.

Servers 302 and 304 and user devices 308 can be implemented using any suitable hardware in some embodiments. For example, in some embodiments, devices 302, 304, and 308 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Figure 4:
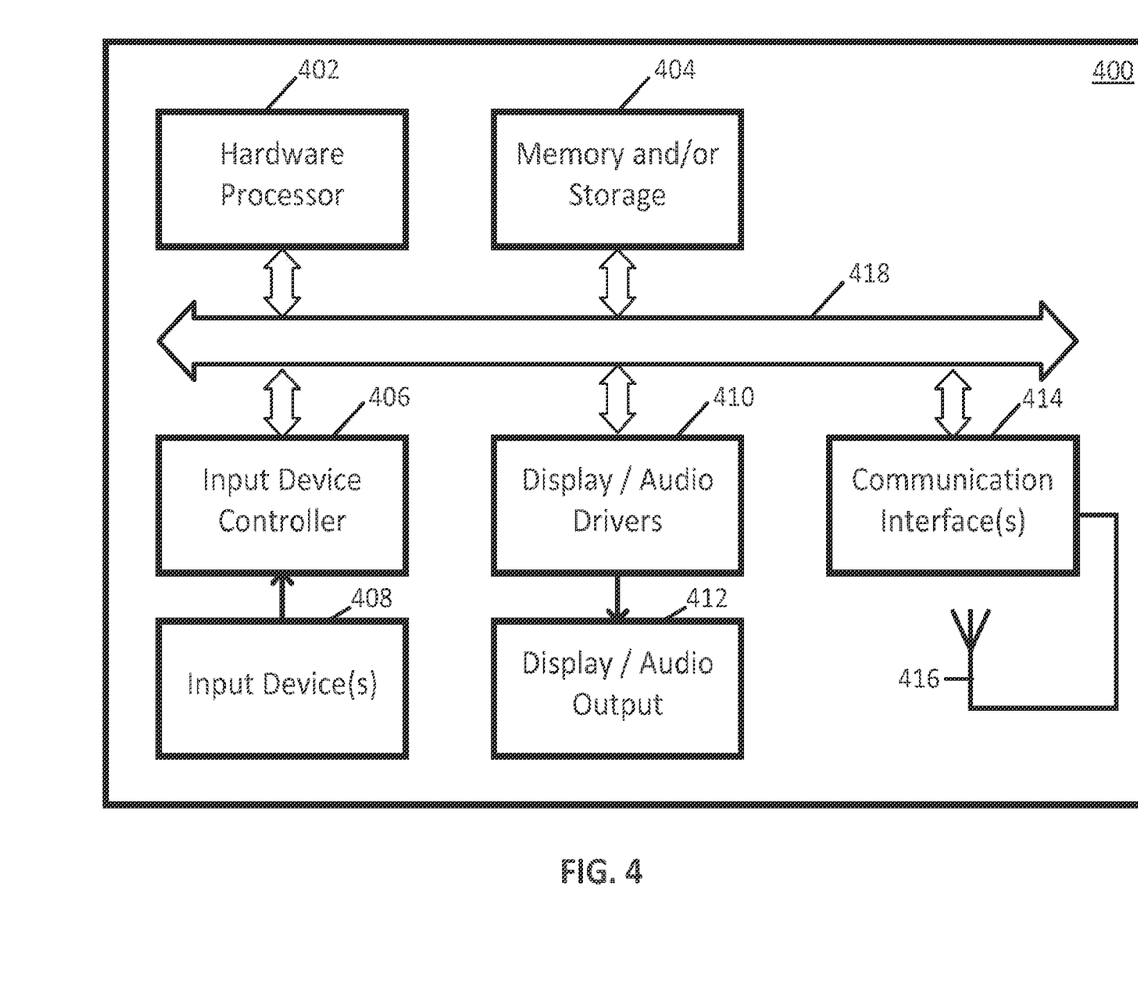
FIG. 4 shows a detailed example of hardware that can be used in a server and/or a user device of FIG. 3 in accordance with some embodiments of the disclosed subject matter.

Hardware processor 402 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 402 can be controlled by a server program stored in memory and/or storage of a server, such as embedding generation server 302 and/or identification server 304. For example, in some embodiments, a server program of embedding generation server 302 can cause hardware processor 402 to generate an embedding for a particular video using a trained neural network, and/or perform any other suitable functions. As another example, in some embodiments a server program of identification server 304 can cause hardware processor 402 to identify videos that are neighbors of a particular video in a multi-dimensional space based on embeddings of each of the videos, determine whether the video is likely to contain objectionable content based on content of identified neighbors, and/or perform any other suitable functions.

Memory and/or storage 404 can be any suitable memory and/or storage for storing programs, data, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks (e.g., computer network 306). For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 306) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In some embodiments, at least some of the above described blocks of the processes of FIGS. 1 and 2 can be executed or performed in any order or sequence not limited to the order and sequence shown in and described in connection with the figures. Also, some of the above blocks of FIGS. 1 and 2 can be executed or performed substantially simultaneously where appropriate or in parallel to reduce latency and processing times. Additionally or alternatively, some of the above described blocks of the processes of FIGS. 1 and 2 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for identifying videos containing objectionable content are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method comprising:
   identifying, by a computing system using a hardware processor, a video that has been uploaded to a video sharing service;
   generating, by the computing system, an embedding for the video using a neural network, wherein the embedding specifies a location of the video in a multi-dimensional space where a plurality of videos are located based on content of the plurality of videos;
   identifying, by the computing system, from the plurality of videos a plurality of associated videos that each have an associated embedding that is located within a predetermined distance of the embedding of the video in the multi-dimensional space;
   determining, by the computing system, whether the video is likely to include a particular type of objectionable content by at least determining at least a predetermined amount of the plurality of associated videos that contain the particular type of objectionable content; and
   responsive to determining that the video is likely to include the particular type of objectionable content, causing, by the computing system, the video to be blocked from the video sharing service.

2. The method of claim 1, further comprising transmitting, by the computing system, an indication of the video to a user account associated with a verifier prior to causing the video to be blocked from the video sharing service, wherein causing the video to be blocked is responsive to receiving, by the computing system, a verification from the user account associated with the verifier that the video includes the objectionable content.

3. The method of claim 1, further comprising determining, by the computing system, a confidence level that the video includes the particular type of objectionable content based on the predetermined amount.

4. The method of claim 1, wherein identifying the plurality of associated videos that each have the associated embedding that is located within the predetermined distance of the embedding of the video comprises transmitting, by the computing system, a query to a remote server that includes the embedding for the video.

5. The method of claim 1, wherein causing the video to be blocked from the video sharing service comprises assigning, by the computing system, a viewer restriction to the video.

6. The method of claim 1, wherein the predetermined amount is selected from the group consisting of a predetermined amount and a predetermined percentage.

7. The method of claim 2, wherein transmitting the indication of the video to the user account associated with the verifier responsive to determining the at least the predetermined amount of the plurality of associated videos contain the particular type of objectionable content.

8. The method of claim 3, further comprising:
determining, by the computing system, that the confidence level is below a predetermined threshold; and
responsive to determining that the confidence level is below the predetermined threshold, transmitting, by the computing system, an indication of the video to a user account associated with a verifier prior to causing the video to be blocked from the video sharing service, wherein causing the video to be blocked is responsive to receiving, by the computing system, a verification from the user account associated with the verifier that the video includes the objectionable content.

9. A computing system comprising:
a memory that stores instructions; and
processing circuitry that executes the instructions to:
identify a video that has been uploaded to a video sharing service;
generate an embedding for the video using a neural network, wherein the embedding specifies a location of the video in a multi-dimensional space where a plurality of videos are located based on content of the plurality of videos;
identify from the plurality of videos a plurality of associated videos that each have an associated embedding that is located within a predetermined distance of the embedding of the video in the multi-dimensional space;
determine whether the video is likely to include a particular type of objectionable content by at least determining at least a predetermined amount of the plurality of associated videos that contain the particular type of objectionable content; and
responsive to determining that the video is likely to include the particular type of objectionable content, cause the video to be blocked from the video sharing service.

10. The computing system of claim 9, wherein the processing circuitry further executes the instructions to transmit an indication of the video to a user account associated with a verifier prior to causing the video to be blocked from the video sharing service, wherein causing the video to be blocked is responsive to receiving a verification from the user account associated with the verifier that the video includes the objectionable content.

11. The computing system of claim 9, wherein the processing circuitry further executes the instructions to determine a confidence level that the video includes the particular type of objectionable content based on the predetermined amount.

12. The computing system of claim 9, wherein to identify the plurality of associated videos that each have the associated embedding that is located within the predetermined distance of the embedding of the video the processing circuitry further executes the instructions to transmit a query to a remote server that includes the embedding for the video.

13. The computing system of claim 9, wherein to cause the video to be blocked from the video sharing service the processing circuitry further executes the instructions to assign a viewer restriction to the video.

14. The computing system of claim 9, wherein the predetermined amount is selected from the group consisting of a predetermined amount and a predetermined percentage.

15. The computing system of claim 10, wherein transmitting the indication of the video to the user account associated with the verifier is responsive to determining the at least the predetermined amount of the plurality of associated videos contain the particular type of objectionable content.

16. The computing system of claim 11, wherein the processing circuitry further executes the instructions to:
determine that the confidence level is below a predetermined threshold; and
responsive to determining that the confidence level is below the predetermined threshold, transmit an indication of the video to a user account associated with a verifier prior to causing the video to be blocked from the video sharing service, wherein causing the video to be blocked is responsive to receiving a verification from the user account associated with the verifier that the video includes the objectionable content.

17. A non-transitory computer-readable storage medium comprising instructions, that when executed by processing circuitry of a computing system, cause the processing circuitry to:
identify a video that has been uploaded to a video sharing service;
generate an embedding for the video using a neural network, wherein the embedding specifies a location of the video in a multi-dimensional space where a plurality of videos are located based on content of the plurality of videos;
identify from the plurality of videos a plurality of associated videos that each have an associated embedding that is located within a predetermined distance of the embedding of the video in the multi-dimensional space;
determine whether the video is likely to include a particular type of objectionable content by at least determining at least a predetermined amount of the plurality of associated videos that contain the particular type of objectionable content; and
responsive to determining that the video is likely to include the particular type of objectionable content, cause the video to be blocked from the video sharing service.

18. The non-transitory computer-readable storage medium of claim 17, wherein the instructions, when further executed by the processing circuitry, cause the processing circuitry to determine a confidence level that the video includes the particular type of objectionable content based on the predetermined amount.

19. The non-transitory computer-readable storage medium of claim 17, wherein to cause the video to be blocked from the video sharing service the instructions, when further executed by the processing circuitry, cause the processing circuitry to assign a viewer restriction to the video.

20. The non-transitory computer-readable storage medium of claim 18, wherein the instructions, when further executed by the processing circuitry, cause the processing circuitry to:
 determine that the confidence level is below a predetermined threshold; and
 responsive to determining that the confidence level is below the predetermined threshold, transmit an indication of the video to a user account associated with a verifier prior to causing the video to be blocked from the video sharing service, wherein causing the video to be blocked is responsive to receiving a verification from the user account associated with the verifier that the video includes the objectionable content.

* * * * *